(12) United States Patent  
Valle et al.

(10) Patent No.: US 8,820,268 B2  
(45) Date of Patent: Sep. 2, 2014

(54) TREAT DISPENSER

(75) Inventors: Andrea Valle, Stanhope, NJ (US);
Jonathan Willinger, Tenafly, NJ (US);
Ryan Rutherford, Belleville, NJ (US)

(73) Assignee: JW Pet Company, Inc., Teterboro, NJ (US)

(*) Notice: Subject to any disclaimer, the term of this patent is extended or adjusted under 35 U.S.C. 154(b) by 0 days.

(21) Appl. No.: 13/532,291

(22) Filed: Jun. 25, 2012

(65) Prior Publication Data

US 2013/0055965 A1    Mar. 7, 2013

Related U.S. Application Data

(60) Provisional application No. 61/530,057, filed on Sep. 1, 2011.

(51) Int. Cl.
*A01K 29/00* (2006.01)
*A01K 15/02* (2006.01)

(52) U.S. Cl.
CPC .................................. *A01K 15/025* (2013.01)
USPC .......................................................... 119/710

(58) Field of Classification Search
USPC .................................. 119/710, 711, 709, 702
See application file for complete search history.

(56) References Cited

U.S. PATENT DOCUMENTS

| | | |
|---|---|---|
| 1,534,964 A | 4/1925 | Kahnweiler |
| 2,086,631 A | 7/1937 | Munro |
| D188,179 S | 6/1960 | Tay |
| 4,451,038 A | 5/1984 | Nagy |
| 4,595,369 A | 6/1986 | Downs |
| 5,758,604 A | 6/1998 | Jorgensen |
| 5,813,366 A | 9/1998 | Mauldin, Jr. |
| 5,819,690 A | 10/1998 | Brown |
| 5,947,061 A | 9/1999 | Markham et al. |
| 5,965,182 A | 10/1999 | Lindgren |
| 6,073,581 A | 6/2000 | Wang |
| 6,098,571 A | 8/2000 | Axelrod et al. |

(Continued)

FOREIGN PATENT DOCUMENTS

| | | |
|---|---|---|
| WO | 95/35137 | 12/1995 |
| WO | 98/52424 | 11/1998 |

OTHER PUBLICATIONS

Treat Dispensing Pickle Pocket downloaded from http://www.aboutdogtraining.com/product/1607/Treat-Dispensing-Pickle-Pocket.html on Jul. 11, 2012.

(Continued)

*Primary Examiner* — Monica Williams
*Assistant Examiner* — Jessica Wong
(74) *Attorney, Agent, or Firm* — Eckert Seamans Cherin & Mellott, LLC; Brij K. Agarwal (57) ABSTRACT

One embodiment of a treat dispenser for an animal comprises a container having a first interior for receiving treats, a first opening for dispensing treats from the interior, a removable cap for inserting treats into the interior, and a first axis, and a cover at least partially surrounding the container to define a second interior between the cover and the container that receives treats dispensed from the first interior. The cover has a second opening for dispensing treats from the second interior. The cover is preferably slidable and rotatable along the first axis relative to the container. In one embodiment, the treat dispenser is attached to a rollable frame.

17 Claims, 8 Drawing Sheets

(56) References Cited

U.S. PATENT DOCUMENTS

| | | | |
|---|---|---|---|
| 6,129,053 | A | 10/2000 | Markham et al. |
| 6,158,391 | A | 12/2000 | Simonetti |
| 6,167,841 | B1 | 1/2001 | Ho |
| 6,217,408 | B1 | 4/2001 | Willinger |
| 6,237,538 | B1 | 5/2001 | Tsengas |
| 6,427,634 | B1 | 8/2002 | Mann |
| 6,484,671 | B2 * | 11/2002 | Herrenbruck ............. 119/707 |
| 6,485,349 | B1 | 11/2002 | Snyder et al. |
| 6,526,912 | B1 | 3/2003 | Ottonson |
| 6,557,496 | B2 | 5/2003 | Herrenbruck |
| D494,716 | S | 8/2004 | Chang |
| 7,082,895 | B2 | 8/2006 | Barney et al. |
| 7,246,574 | B2 | 7/2007 | Renforth |
| D552,307 | S | 10/2007 | Renforth et al. |
| 7,389,748 | B2 | 6/2008 | Shatoff et al. |
| D579,157 | S | 10/2008 | Edwards |
| 7,506,613 | B2 | 3/2009 | Wolfe, Jr. et al. |
| 7,555,997 | B2 | 7/2009 | Wolfe, Jr. et al. |
| 7,591,234 | B2 | 9/2009 | Shatoff et al. |
| 7,600,488 | B2 | 10/2009 | Mann |
| 7,640,894 | B2 | 1/2010 | Jager |
| 7,681,763 | B2 | 3/2010 | McGuyer |
| 7,866,281 | B2 | 1/2011 | Willinger |
| D658,817 | S | 5/2012 | Costello et al. |
| 2002/0124811 | A1 * | 9/2002 | Willinger et al. ............. 119/707 |
| 2007/0289553 | A1 * | 12/2007 | Jager ........................... 119/710 |
| 2008/0121190 | A1 | 5/2008 | Moulton |
| 2009/0000565 | A1 | 1/2009 | Bryce |
| 2009/0038560 | A1 | 2/2009 | Markham |
| 2010/0186682 | A1 * | 7/2010 | Myers, Jr. ..................... 119/709 |
| 2011/0000441 | A1 | 1/2011 | Woltmann et al. |
| 2011/0083608 | A1 | 4/2011 | Markham et al. |
| 2011/0139815 | A1 | 6/2011 | Benson |
| 2011/0214617 | A1 | 9/2011 | Markham |
| 2012/0012068 | A1 | 1/2012 | Costello |

OTHER PUBLICATIONS

Bob-A-Lot downloaded from http://aboutdogtraining.sitestreet.com/199/Bob-A-Lot.htm on Jul. 11, 2012.

Funkitty Egg-Cersizer downloaded from http://www.premier.com/View.aspx?page=cats/products/toys/funkitty/egg/description on Jul. 11, 2012.

Kibble Nibble downloaded from http://www.premier.com/View.aspx?page=dogs/products/toys/busybuddy/kibblenibbletoys on Aug. 6, 2012.

Magic Mushroom downloaded from http://www.premier.com/View.aspx?page=dogs/products/behavior/busybuddy/magicmushroom on Aug. 6, 2012.

ORKA Jack downloaded from http://www.petstages.com/product.php?Product_Index=26 on Aug. 6, 2012.

KONG Classic downloaded from http://www.kongcompany.com/products/for-dogs/rubber-toys/classic-rubber-toys/ classic-2 on Aug. 6, 2012.

ORKA Tennis Ball downloaded from http://www.petstages.com/product.php?Product_Index=30 on Aug. 6, 2012.

\* cited by examiner

TREAT DISPENSER

CROSS-REFERENCE TO RELATED APPLICATIONS

This application claims the benefit of U.S. Provisional Application 61/530,057 filed Sep. 1, 2011, the contents of which are incorporated herein by reference.

FIELD OF THE INVENTION

The present invention relates to a treat toys for animals generally, and more particularly to a treat dispenser having, in one embodiment, a container surrounded by a cover that is movable relative to the container and that is provided with an opening for dispensing treats.

BACKGROUND

The prior art provides pet toys that dispense animal treats when the toy is rolled or otherwise manipulated. Such structures have a variety of forms and arrangements of holes and openings. These treat-discharging toys are generally comprised of a wall, forming a hollow body configured for rolling and defining an interior cavity and one or more openings being dimensioned and configured for passage of animal treats into and out of the cavity.

Despite the advancements in the art, a need remains for a treat dispenser which sustains a pets' attention for longer periods of time. Many pets have a relatively short attention span and are easily bored. What is needed is a new type of rolling treat dispenser which dispenses treats differently from the prior art, thereby sparking a pet's interests for longer periods of time.

SUMMARY

In accordance with one embodiment, a treat dispenser comprises a container having a first interior for receiving treats, a first opening for dispensing treats from the interior, a removable cap for inserting treats into the interior, and a first axis, and a cover at least partially surrounding the container to define a second interior between the cover and the container that receives treats dispensed from the first interior. The cover has a second opening for dispensing treats from the second interior. The cover is preferably slidable and rotatable along the first axis relative to the container between a first limit and a second limit defined on the container. In one embodiment, the treat dispenser is attached to a rollable frame that allows a pet to roll the treat dispenser along a surface, thereby providing the pet with enjoyment over long periods of time. Furthermore, the frame acts as a see-through barrier to prevent the pet from having direct access to the treat-dispensing opening. This barrier may arouse the curiosity and interest of a pet, as the pet can see the treat being dispensed but cannot enjoy the treat until the treat falls through the frame.

DETAILED DESCRIPTION OF THE PREFERRED EMBODIMENTS

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality.

In one embodiment, the present invention is directed to an animal treat dispenser to enable a pet or an animal to partially control the dispensing of treats from the device while also providing the animal with a toy as a means for enjoyment. A "treat" as used herein is meant to include all animal foodstuffs that can be consumed by an animal, and may take various forms such as uniformly sized nuggets, or the treat may be irregularly sized and shaped. Other shapes and configuration are possible.

Figure 1A:
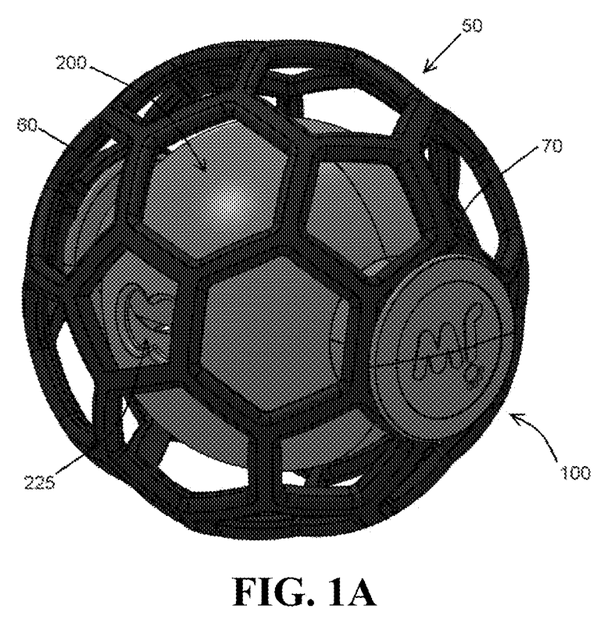
FIG. 1 is one embodiment of a perspective view of a treat dispenser and frame of the present disclosure.
Figure 1B:
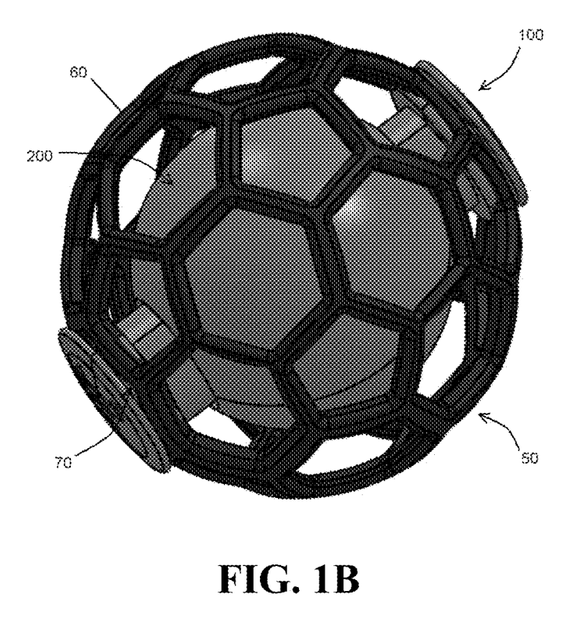
Figure 2:
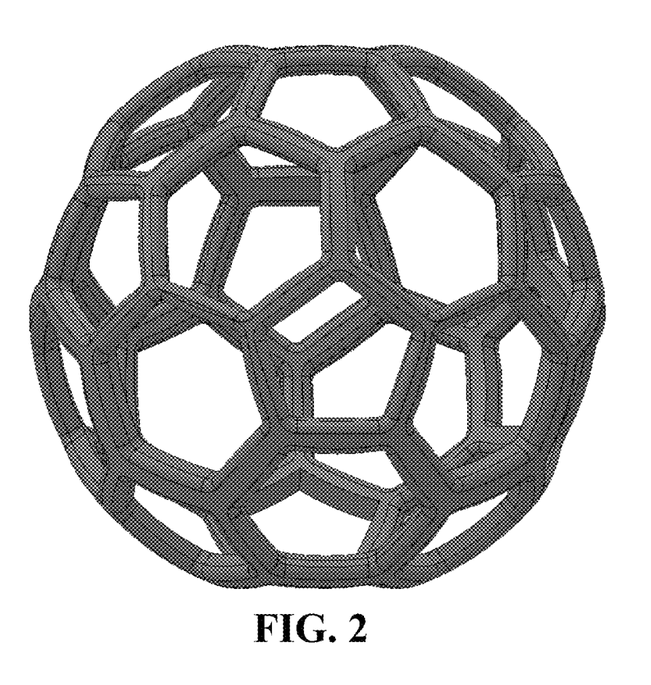
FIG. 2 is another view of the treat dispenser and frame of FIG. 1.

FIGS. 1A and 1B illustrate one embodiment of a perspective view of a treat dispenser 100 attached to one embodiment of a rollable frame 50 such as the Holee Roller (trademark) manufactured by JW Pet Company of Teterboro, N.J. and shown separately in FIG. 2. The wall 60 of the rollable frame 50 is preferably a one-piece construction, although more than one piece is contemplated, and it is formed from a resilient material that is capable of rolling and bouncing along a surface and has openings 70 that can accommodate the dispenser 100 as discussed below. While one embodiment of a rollable frame 50 is illustrated, it will be appreciated that other rollable frames may be used having different shapes, sizes and materials, as long as the frame is capable of being attached to the treat dispenser 100 as set forth herein or using any other means necessary. Some examples of other rollable frames may be found in U.S. Pat. No. 6,622,659, assigned to JW Pet Company, the contents of which are incorporated herein by reference. It should be appreciated that the treat dispenser 100 may be used independent of a frame 50, although it is preferable that it is attached to a frame 50 for purposes of rolling and the like.

Figure 3:
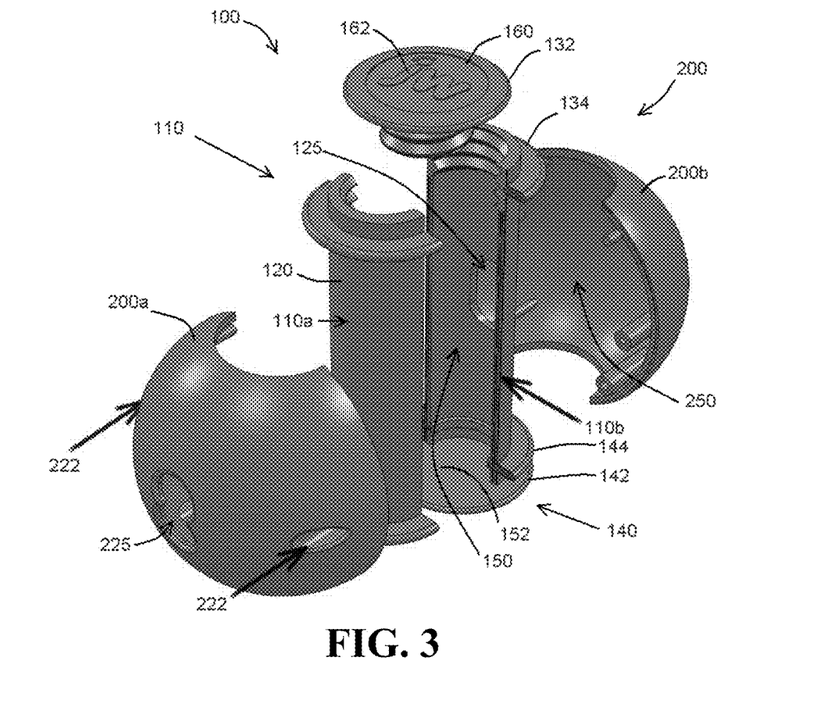
FIG. 3 is one embodiment of a partially exploded view of a treat dispenser.
Figure 4:
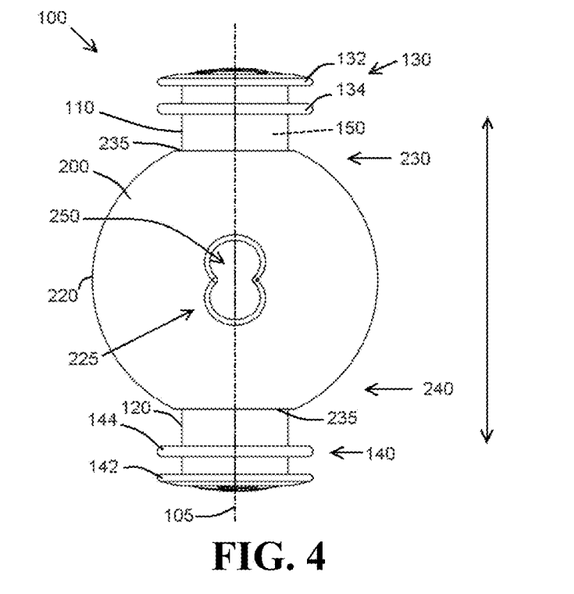
FIG. 4 is one embodiment of a front view of an assembled treat dispenser.
Figure 5A:
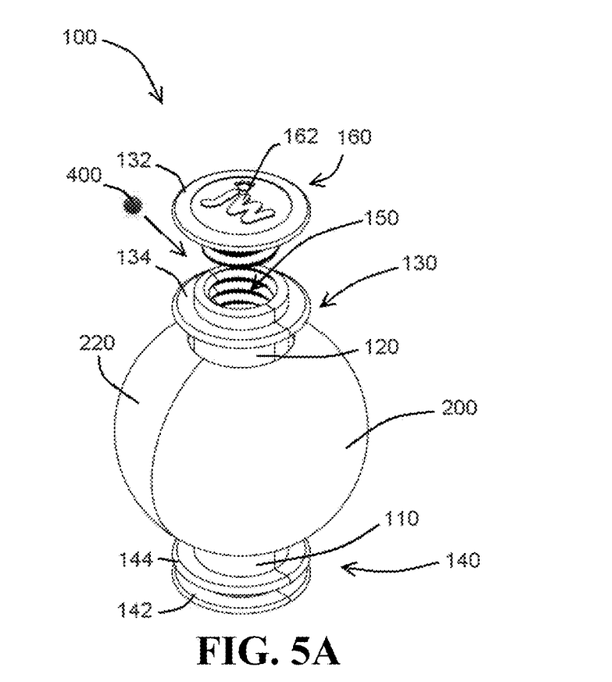
FIG. 5A is one embodiment of a treat dispenser showing the insertion of a treat.
Figure 5B:
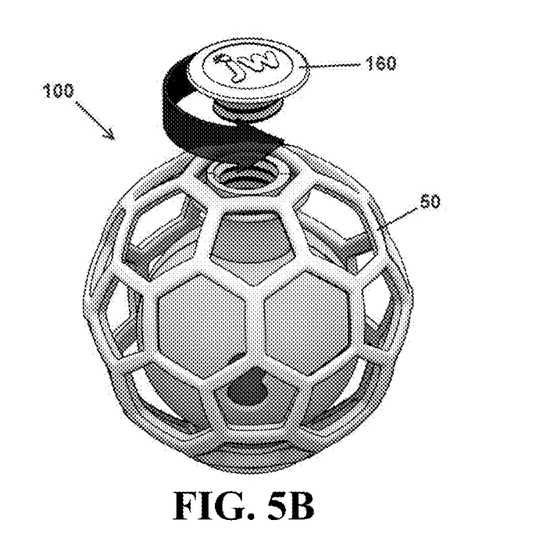
FIGS. 5B-5D illustrate one embodiment of a treat dispenser and frame showing the insertion of a treat.
Figure 5C:
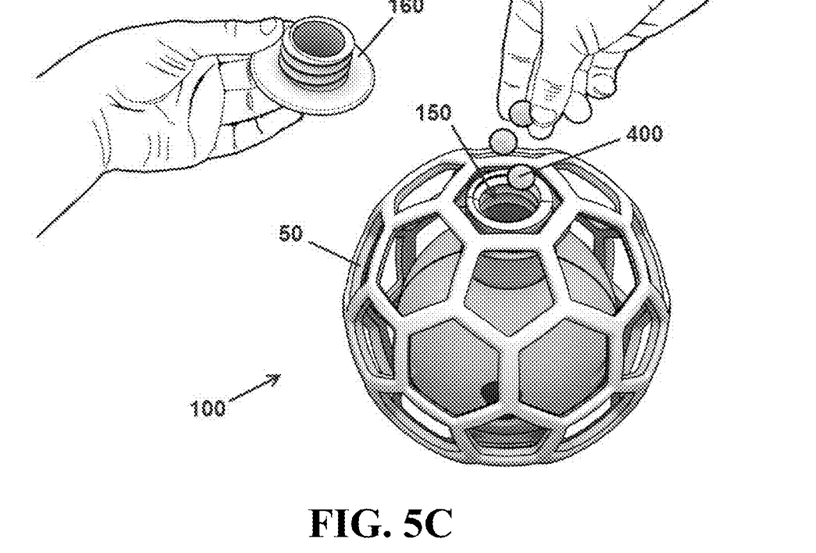
Figure 5D:
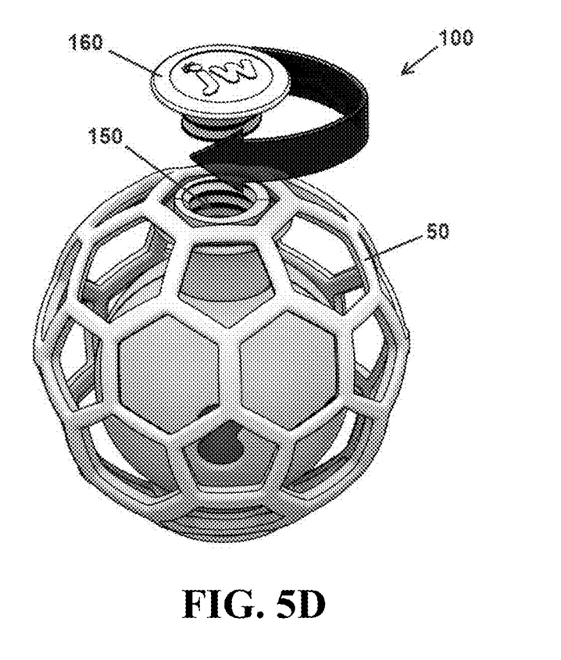
Figure 6:
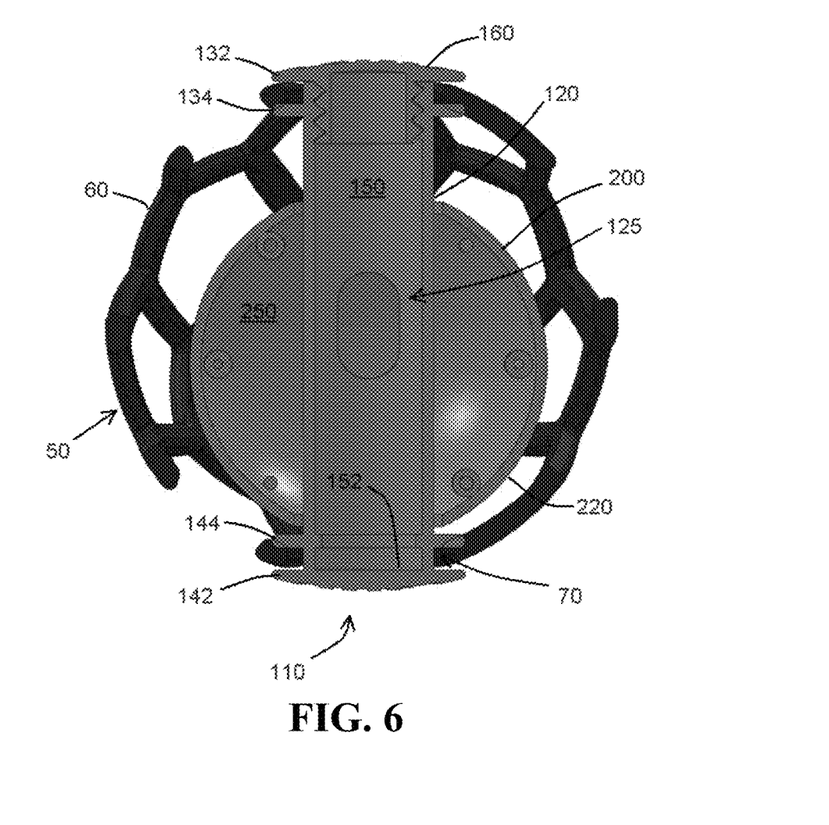
FIG. 6 is one embodiment of a partial cross-section of a treat dispenser and frame.
Figure 7:
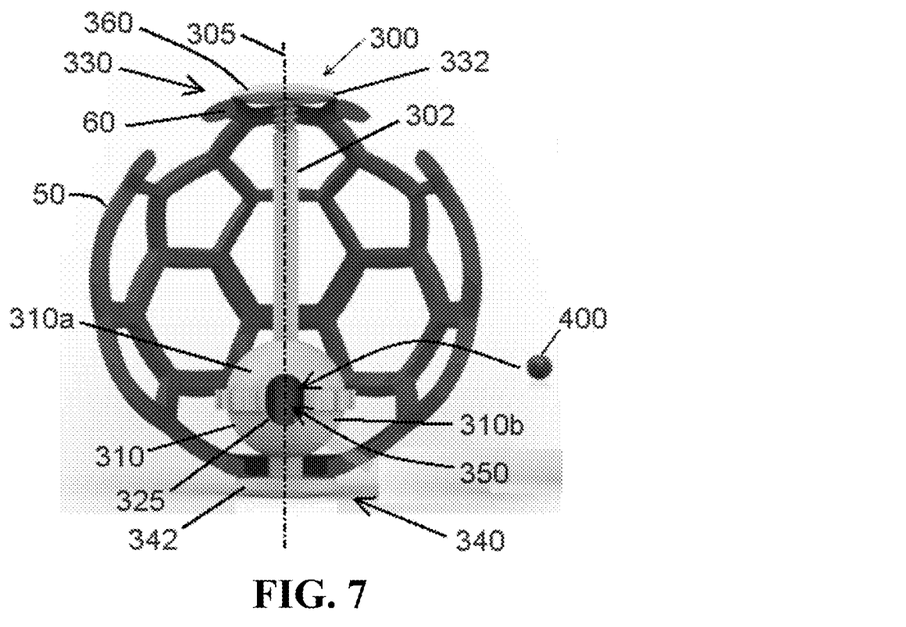
FIG. 7 is an alternate embodiment of a treat dispenser and frame.

FIG. 3 illustrates one embodiment of an exploded view, FIG. 4 illustrates one embodiment of a front view, FIG. 5A illustrates one embodiment of a partially exploded view of the treat dispenser 100 shown separately from the rollable frame 50, FIGS. 5B-5D illustrate one embodiment of a treat dispenser 100 and frame 50 showing the insertion of a treat 400, while FIG. 6 illustrates one embodiment of a cross-sectional view of the treat dispenser 100 shown attached to the rollable frame 50. The treat dispenser 100 generally comprises a container 110 formed from an outer wall 120 having a first end 130 and a second end 140 aligned along an axis 105 and that define an interior 150 for receiving and containing treats 400 (see FIGS. 5A-10, for example) and for dispensing treats through an opening 125 defined in the outer wall 120 of the container 110. In the illustrated embodiment, each of the first and second ends 130 and 140 further comprises an outer section 132, 142 and an inner section 134, 144 that are spaced apart to form collars that receive a portion of the wall 60 of the rollable frame 50 as shown in FIG. 6. In one embodiment, the wall 60 may be stretched over the outer sections 132, 142 so that frame openings 70 are occupied by the opposite ends 130, 140 of the container 110 as shown in FIGS. 1A, 1B and 6. One of the outer sections 132, 142 also preferably comprises a removable cap 160 threadingly engaged onto the wall 120 as shown in FIGS. 3 and 5A, for example, for inserting treats 400 into the interior 150 (FIG. 5C). While a thread engagement is shown, other manners of engagement are contemplated. The outer sections 132, 142 are preferably curved to maintain the rollability of the treat dispenser 100 when it is attached to the rollable frame 50, and one or both of the outer sections 132, 142 may have identifying information 162 (FIG. 5A) thereon such as a company logo, for example, and/or instructions (not shown) for removal and insertion of treats into the interior 150. In an alternative embodiment (not shown), a removable cap 160 may be provided on either end 130 or 140 of the container 110 and may form both of the outer sections 132, 142 if desired. In the illustrated embodiment, however, the outer section 142 forms a floor 152 (FIGS. 3 and 6) of the interior 150.

The treat dispenser 100 further comprises a cover 200 having an outer wall 220 that at least partially surrounds the container 110 to define a second interior 250 between the outer wall 220 and the container 110. The second interior 250 receive treats (not shown) dispensed through the opening 125 in the container outer wall 120. The cover 200 further comprises an opening 225 in its outer wall 220 for dispensing treats resident in the cover interior 250 to the outside of the dispenser 100. Thus, treats that are inserted into the container 110 preferably by way of the removable cap 160 must first pass through the opening 125 in the outer wall 120 of the container 110, and then pass through the opening 225 in the outer wall 220 of the cover 200. The opening 225 in the outer wall 220 may have a different configuration than the opening 125 in the outer wall 120 of the container 110, and such opening 225 may also be larger than the container opening 125 in the event it is desired to dispense larger treats through such opening 225. The openings 125 and 225 may also have unique shapes, such as, but not limited to, a bone shape, and there may be more than one opening through either or both of the outer wall 120, 220 of the container 110 or cover 200. In addition, the diameter of the cover 200 is preferably more than half the diameter of the rollable frame 50 to provide some additional stability when being rolled along a surface. The diameter of the cover 200 is also preferably more than twice the diameter of the container 110 to allow for a sufficient interior 250 space to accommodate larger treats and to provide an enlarged area for treats to move and rattle around.

The cover 200 is preferably movable along the axis 105 of the container 110 relative to the container 110 between inner sections 134 and 144 that function to limit the movement of the cover 200 along the axis 105 relative to the container 110. More specifically, the outer wall 220 of the cover 200 is preferably both slidable along and rotatable around the outer wall 120 of the container 110 by way of openings 235 at opposite ends 230 and 240 of the cover 200 (FIG. 4), which openings 235 preferably have a diameter that is slightly larger than the diameter of the outer wall 120 of the container 110, but that is smaller than the diameter of the inner sections 134 and 144 of the outer wall 120. This movement of the cover 200 relative to the container 110 creates an enjoyable and interactive experience for a pet 500 (see, for example, FIGS. 9-10) as the treat dispenser 100 and frame 50 is thrown or rolled along a surface, which agitates the treats resident in both the container interior 150 and the cover interior 250, and which causes the treats to move from the container interior 150 into the cover interior 250 and to be dispensed to a pet through the opening 225 in the outer wall 220 of the cover 200. In addition, the movement of the treat dispenser 100 and frame 50 causes the cover 200 to move relative to the container 110, hitting the inner sections 134, 144 and causing a clacking sound, and further causing the cover 200 to rotate around the container 110 and increase the visual stimulation for a pet and also to erratically dispense treats through the opening 225 in the outer wall 220 of the cover 200.

In one embodiment, the treat dispenser 100 is formed by first providing a container 110, that may be manufactured by sonically welding two container halves 110a and 110b together for a more permanent connection, for example, and then attaching the cover 200 around the container 110 by any means now know or hereinafter developed. For example, threaded fasteners (not shown) may be inserted into openings 222 in the outer wall 220 (FIG. 3) to join together two cover halves 200a and 200b for a non-permanent connection. Other methods of manufacturing and assembling the container 110 and cover 220 are possible. The treat dispenser 100 is then attached to a rollable frame 50 by stretching the walls 60 of the frame 50 over the outer sections 132, 142 so that such walls 60 reside between the outer sections 132, 142 and inner sections 134, 144 and so that frame openings 70 are occupied by the opposite ends 130, 140 of the container 110 as shown in FIGS. 1A, 1B and 6. Treats are added to the container 110 through the removable cap 160 (FIG. 5A) by first unscrewing the removable cap 160 (FIG. 5B), adding treats 400 into the interior 150 (FIG. 5C), re-attaching the cap 160 (FIG. 5D), and then the treat dispenser 100 and frame 50 is then thrown to and enjoyed by a pet. The treat dispenser 100 may be easily removed from the frame 50 and the cover 200 may be disassembled from the container 110 for cleaning as desired.

As an animal plays with and rolls the dispenser 100, treats are dispensed through the opening 225 in the cover 200, through openings 70 in the rollable frame 50, and onto the floor or ground for the animal to enjoy. As the animal continues to push and roll the dispenser 100 and frame 50, treats may collide with the interior walls of the cover 200 and of the container 110 to create an audible rattling or clicking sound, while the cover 200 collides with the inner sections 134, 144, which collectively interest the pet to continue to play with the dispenser 100 in an effort to extract more treats. In addition, the frame 50 creates a soft barrier that prevents the animal from having direct access to the opening 225 in the cover 200. This barrier may arouse the curiosity and interest of the animal because it is a new way for the pet to obtain a treat. Many pets enjoy sniffing for a treat, and when located, desire to make direct contact with the treat. However, the frame 50 attached to the dispenser 100 does not permit the pet to make direct contact with opening 225, even though the pet can see the opening 225. This allows the pet to see a treat being dispensed from the opening 225 even though the pet cannot enjoy the treat until it falls through openings 70 in the frame 50.

FIGS. 7-10 collectively illustrate an alternative embodiment of a treat dispenser 300 attached to the rollable frame 50, the treat dispenser further comprising a rod-like support 302 having an axis 305, a container 310 attached to the support 302 and having an interior 350 for receiving treats 400 and an opening 325 for dispensing treats 400 from the interior 350, the container 310 being slidable along and rotatable around the support 302. In the illustrated embodiment, the opening 325 is adjustable to vary the frequency by which treats are dispensed from the interior 350. The support 302 has a first end 330 and a second end 340 aligned along the axis 305, each of the first and second ends 330 and 340 further comprising an outer section 332, 342 that receives a portion of the wall 60 of the rollable frame 50. One of the outer sections 332, 342 also preferably comprises a cap 360 threadingly engaged onto the support 302 for varying the length of the support 302 and to enable the treat dispenser 300 to accommodate a variety of differently configured and sized frames 50 if desired. The outer sections 332, 342 are preferably curved to maintain the rollability of the treat dispenser 300 when it is attached to the rollable frame 50. The container 310 may be formed from two halves 310a and 310b that are threadingly engaged with each other to enable a pet owner (not shown) to fill the interior 350 with treats prior to engagement of the container 310 with the support, or the pet owner may insert treats through the opening 325 and then adjust the size of the opening 325.

Figure 8:
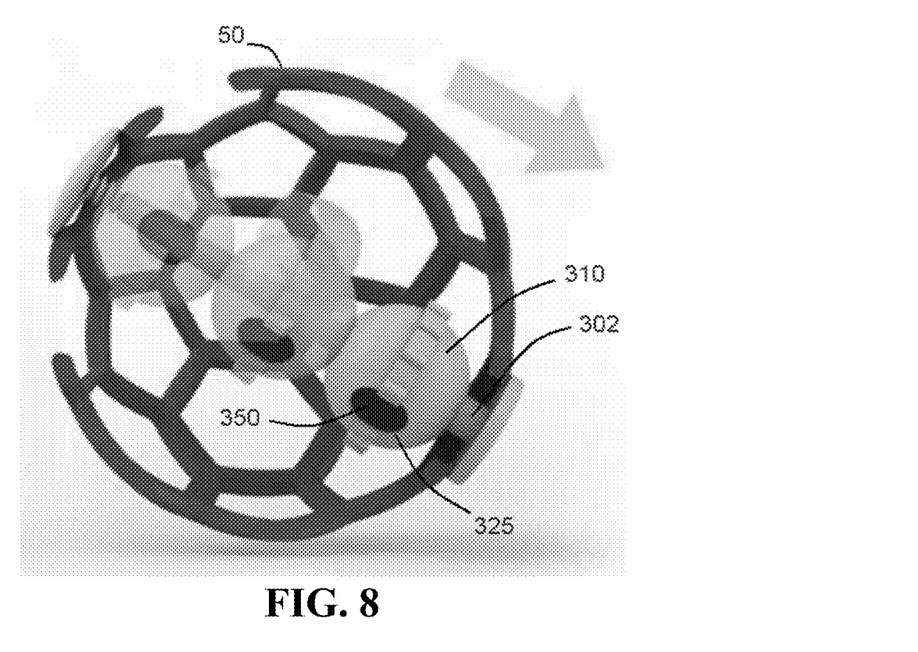
FIG. 8 illustrates movement of the treat dispenser and frame of FIG. 7.
Figure 9:
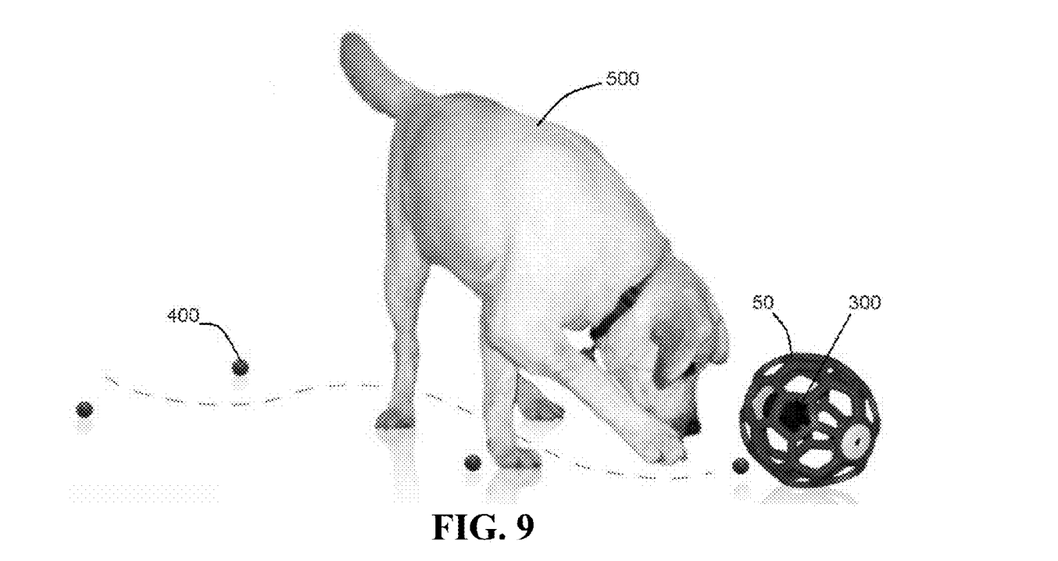
FIGS. 9 and 10 illustrate a pet enjoying the treat dispenser and frame of FIG. 7.
Figure 10:
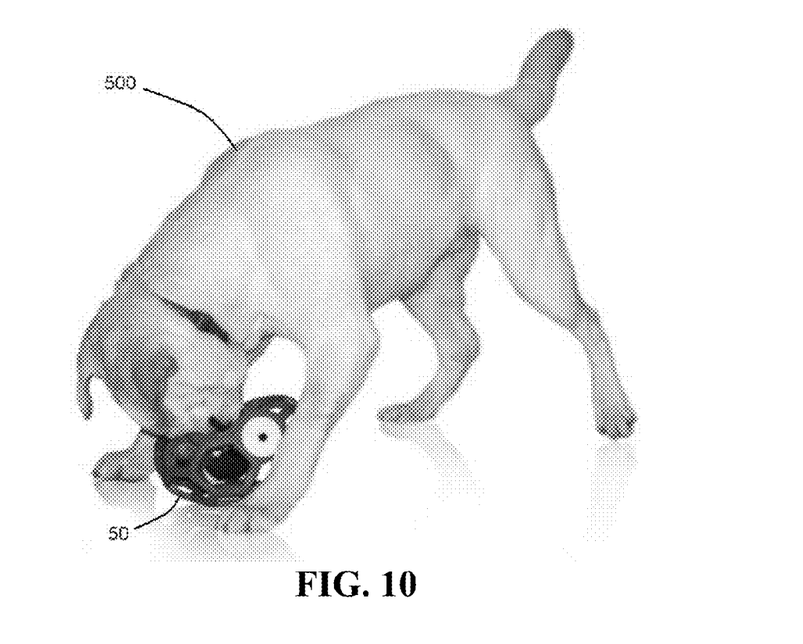

As shown in FIGS. 8-10, this movement of the container 310 relative to the support 302 creates an enjoyable and interactive experience for a pet 500 as the treat dispenser 300 and frame 50 is thrown or rolled along a surface. This agitates the treats 400 in the container interior 350 and causes the container 310 to move relative to the support 302, hitting the walls of the frame 50, and further causing the container 310 to rotate around the support 302, which increases the visual stimulation for a pet and also erratically dispenses treats 400 through the opening 325. In addition, the resilient wall structure of the frame 50 engages the pet 500 which keeps treats out of reach as shown in FIG. 10.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A treat dispenser for an animal comprising: a container having a first interior being structured for receiving treats, a first opening being structured for dispensing treats from the first interior, and a first axis; a cover at least partially surrounding the container to define a second interior between the cover and the container that is structured to receive treats dispensed from the first interior, the cover having a second opening being structured for dispensing treats from the second interior; the cover being movable along the first axis relative to the container between a first limit and a second limit defined on the container; a rollable frame attached to the container and structure to resist direct access to the second opening by an animal; and wherein the container comprises a first collar and a second collar, and wherein the rollable frame is attached to the first and second collars on opposite ends of the container.

2. The treat dispenser of claim 1, wherein the cover is slidable along the first axis between the first and second limits and is rotatable around the first axis relative to the container.

3. The treat dispenser of claim 2, where each of the first collar and the second collar further comprises an outer member and an inner member, the inner members defining the first and second limits.

4. The treat dispenser of claim 3, wherein one of the outer members includes a removable cap.

5. The treat dispenser of claim 3, wherein the outer members are curved.

6. The treat dispenser of claim 5, further comprising identifying information provided on at least one of the outer members.

7. The treat dispenser of claim 1, wherein the first and second openings have different configurations.

8. The treat dispenser of claim 7, wherein the second opening is shaped like a bone.

9. The treat dispenser of claim 7, wherein the second opening is movable relative to the first opening.

10. The treat dispenser of claim 1, wherein the rollable frame further comprises a resilient, one-piece framework.

11. The treat dispenser of claim 1, where each of the first collar and the second collar further comprises an outer member and an inner member, the inner members defining the first and second limits.

12. The treat dispenser of claim 11, wherein one of the outer members includes a removable cap.

13. The treat dispenser of claim 11, wherein the outer members are curved to assist in the rolling of the treat dispenser.

14. The treat dispenser of claim 1, wherein one of the collars includes a removable cap.

15. The treat dispenser of claim 1, wherein a diameter of the cover is more than half the diameter of the rollable frame.

16. The treat dispenser of claim 15, wherein a diameter of the cover is more than twice the diameter of the container.

17. The treat dispenser of claim 1, further comprising a removable cap threadingly engaged with the container.

* * * * *